United States Patent [19]

Massa et al.

[11] Patent Number: 5,074,723
[45] Date of Patent: Dec. 24, 1991

[54] METHOD AND APPARATUS FOR BALANCING A ROTARY TOOL ASSEMBLY

[75] Inventors: Ted R. Massa, Latrobe; David R. Siddle, Greensburg, both of Pa.

[73] Assignee: Kennametal Inc., Latrobe, Pa.

[21] Appl. No.: 337,589

[22] Filed: Apr. 13, 1989

[51] Int. Cl.⁵ .................................................. B23C 9/00
[52] U.S. Cl. ................................. 409/131; 409/141; 408/143; 51/169; 74/573 R; 82/903
[58] Field of Search ............... 409/141, 131; 408/143, 408/1; 51/169; 74/573 R; 73/66, 468–470; 279/1 J; 82/903, 147; 384/199; 464/127, 180; 29/901

[56] References Cited

U.S. PATENT DOCUMENTS

| | | | |
|---|---|---|---|
| 525,799 | 9/1894 | Rymes | 74/573 R |
| 1,645,343 | 10/1925 | Moorhouse | 74/573 R |
| 1,980,693 | 11/1934 | Newman et al. | 74/573 R |
| 2,241,637 | 5/1938 | Ernst et al. | 73/458 |
| 2,861,471 | 8/1956 | Kronenberg | 74/573 R |
| 3,000,240 | 9/1961 | Eckardt | 408/151 |
| 3,528,316 | 12/1968 | Hammer | 74/573 R |
| 4,294,135 | 10/1981 | Tameo | 74/573 R |
| 4,626,144 | 12/1986 | Berner | 408/143 |
| 4,951,526 | 8/1990 | Linder | 51/169 X |

FOREIGN PATENT DOCUMENTS

| | | | |
|---|---|---|---|
| 2134270 | 1/1973 | Fed. Rep. of Germany | 51/169 |
| 577044 | 2/1924 | France | 74/573 R |

Primary Examiner—Larry I. Schwartz
Assistant Examiner—Robert Schultz
Attorney, Agent, or Firm—John J. Prizzi; Thomas R. Trempus; James G. Poreelli

[57] ABSTRACT

The present invention entails a method and apparatus for balancing a high speed rotary tool assembly. A pair of closed balancing rings are journalled about a cylindrical bearing surface formed around a rotary tool holder with each ring being rotatively mounted about the bearing surface independently of each other. The tool holder is adapted to receive and hold a cutting tool. After determining the unbalance of the tool holder and cutting tool, the rings are rotatively adjusted about the bearing surface to create an unbalance within the tool rings and the position of the tool rings is adjusted such that the created unbalance of the tool rings is disposed opposite the determined unbalance of the rotary tool holder and cutting tool.

27 Claims, 2 Drawing Sheets

METHOD AND APPARATUS FOR BALANCING A ROTARY TOOL ASSEMBLY

FIELD OF THE INVENTION

The present invention relates to tools and more particularly to balancing mechanisms for rotary cutting tool assemblies.

BACKGROUND OF THE INVENTION

The balancing of high speed rotary cutting tools, that is tools that typically turn 10,000 to 20,000 rpm, is very important. If a high speed rotary cutting tool is allowed to operate in an unbalanced state this will result in oscillating forces being created by the tool assembly due to the centrifugal force effect of the unbalance. This typically leads to premature bearing wear or failure and machine vibrations which result in uneven cutting action.

To minimize the unbalanced effects on the tool assembly, the assembly must be accurately balanced. This usually entails a balancing operation each time there is a significant change (e.g. changing tools or reshaping the same tool) in the tool assembly. It is not uncommon to find a tool itself out of balance and it is often difficult to precisely place the cutting tool where its axis is exactly aligned with the axis of the rotary tool holder. Due to the frequent need for rebalancing, there is a need for an efficient, integral, adjustable and accurate balancing system for such high speed rotary cutting tools.

There are commercially available balancing units which allow for quick and accurate measurements of the amount of unbalance in a tool holder and tool assembly. But the problem again is providing a quick and efficient mechanism for accomplishing the balancing operation.

There have been various attempts at designing rotary tool balancing systems. One such design comprised three or more radially screws which are moved radially, inwardly and outwardly, from the axis of the tool holder. This approach is often tedious because typically the various screws making up the mechanism have to be moved by different amounts. In addition, this approach is quite limited in the amount of unbalance that can be corrected without adding more screws and making the method even more complicated and tedious.

A second balancing approach found in the prior art is a system that utilizes two or more movable weights. In this design, the weights are moved to specific positions on a given diameter in order to balance the tool. There are many disadvantages to this approach. Often such a movable weight design is expensive to manufacture, especially those designs that incorporate rings and grooves, etc. Finally, in certain balancing systems incorporating movable weights it can be difficult to incorporate the design within the structure of the tool holder and still be within an industry standard tool envelope (such as ANSI and ISO) for that type of tool.

Finally, it has been known to utilize cooperating open type rings about the axis of a rotating tool holder to achieve a final tool balance. See U.S. Pat. No. 4,626,144. This design also has drawbacks. As suggested in this disclosure, the opened balancing rings are actually tied together and cannot be moved and adjusted independently. This limits the versatility of this balancing approach since the individual balancing element cannot be moved completely independently of each other. Besides this, the total balancing mechanism is complicated and expensive to manufacture.

SUMMARY AND OBJECTS OF THE INVENTION

The present inventions entails a rotary cutting tool balancing mechanism that comprises a pair of closed balancing rings that are respectively journalled around a cylindrical bearing surface forming a part of the housing of a rotary tool holder. Preferably, each balancing ring is equally and symmetrically unbalanced. In conventional fashion the magnitude of unbalance and the angular position of that unbalance is determined for the rotary tool holder and a certain cutting tool. Then the pair of closed balancing rings are rotated about the tool holder so that the net balancing effect of the rings precisely counters the unbalance of the tool holder and associated cutting tool.

It is therefore an object of the present invention to provide a rotary cutting tool balancing system that is efficient, integral with the rotary tool holder, and capable of accurately balancing the tool holder and any cutting tool secured within the tool holder.

Still a further object of the present invention resides in the provision of a balancing mechanism for a rotary cutting tool assembly wherein the balancing mechanism provides for positive retention of the balancing elements incorporated into the balancing mechanism.

Another object of the present invention resides in the provision of a balancing mechanism for a rotary cutting tool assembly that can be manufactured at a relatively low cost.

It is also an object of the present invention to provide a rotary cutting tool assembly with an integral balancing mechanism that is designed to precisely and accurately balance a tool holder and associated tool.

A further object of the present invention resides in the provision of a rotary cutting tool balancing system of the character referred to above wherein the balancing rings are so designed such that respective rings can be easily manufactured such that they possess equal and symmetrical unbalance.

It is also an object of the present invention to provide a balancing system for a rotary tool assembly that can be easily and precisely adjusted to counter the unbalance of an associated tool holder and a certain cutting tool secured within that tool holder.

Another object of the present invention resides in the provision of a balancing system for a rotary cutting tool of the character referred to above that is particularly useful for retrofitting existing tooling.

It is also an object of the present invention to provide a balancing mechanism for a rotary tool assembly that has a neat, clean and noncluttered appearance when incorporated into the tool assembly.

It is also a further object of the present invention to provide a balancing mechanism for a rotary cutting tool wherein the balancing rings provide for quiet operation.

Still a further object of the present invention resides in the provision of a balancing mechanism for a rotary cutting tool assembly wherein the design of the balancing mechanism can be incorporated into the tool structure such that the tool structure, including the balancing mechanism, still meets standard ANSI or ISO tool envelope requirements.

Other objects and advantages of the present invention will become apparent and obvious from a study of the following description and the accompanying drawings which are merely illustrative of such invention.

DETAILED DESCRIPTION OF THE INVENTION

With reference to the drawings, there is shown therein a rotary tool assembly incorporating the balancing mechanism of the present invention, the rotary tool assembly and balancing mechanism being indicated generally by the numeral 10.

Figure 1:
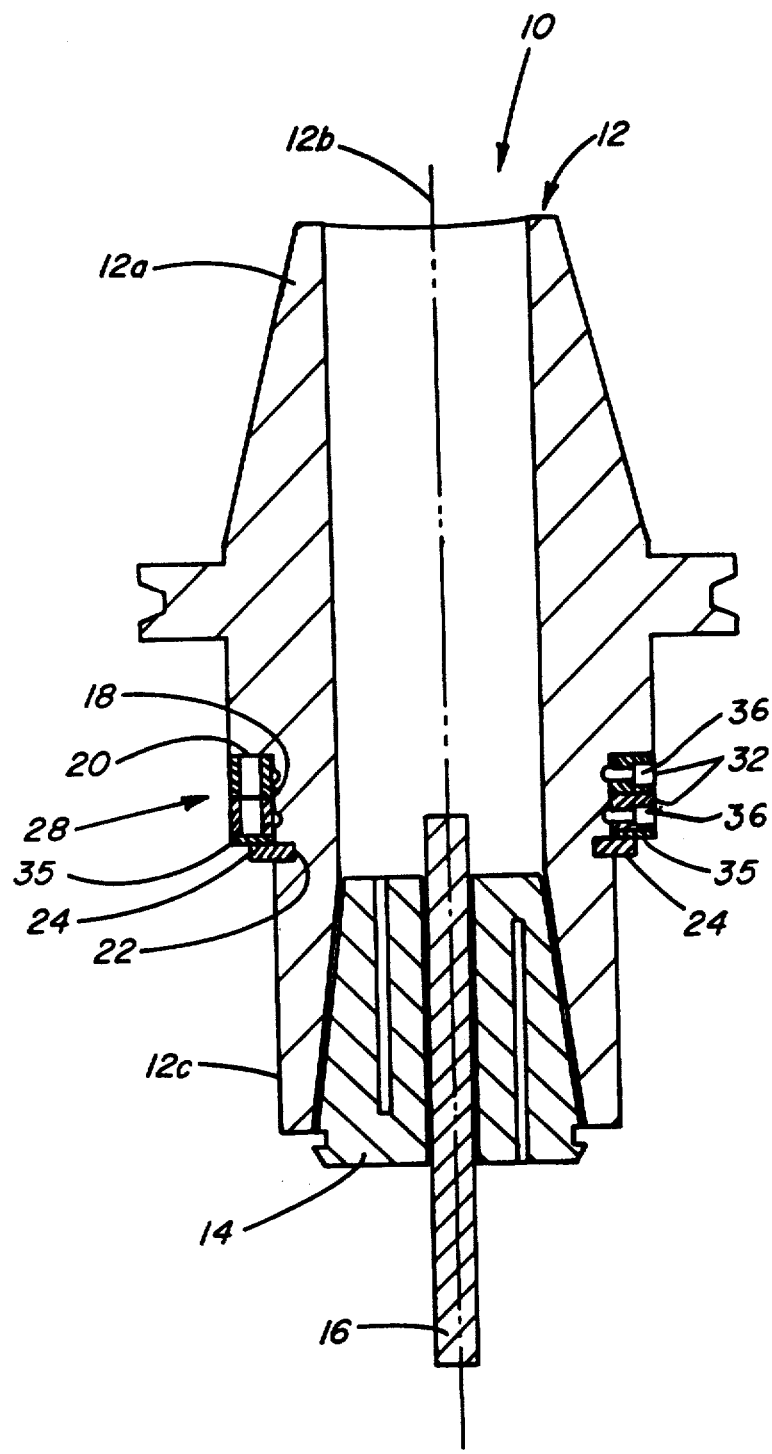
FIG. 1 is a cross-sectional schematic view of a tool holder having the ring balancing mechanism of the present invention incorporated therein.
Figure 2:
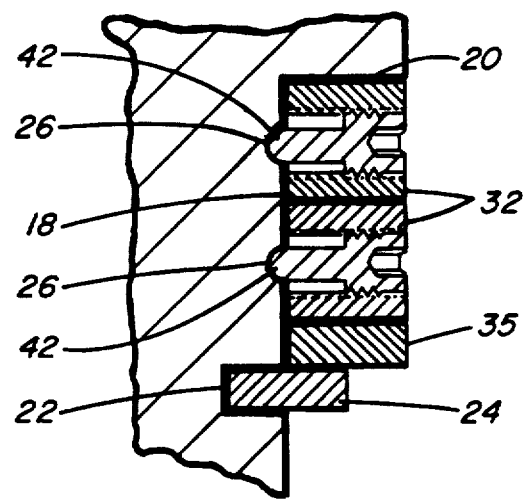
FIG. 2 is an enlarged fragmentary sectional view showing the balancing rings journalled about a cylindrical bearing surface formed around the tool holder.
Figure 3:
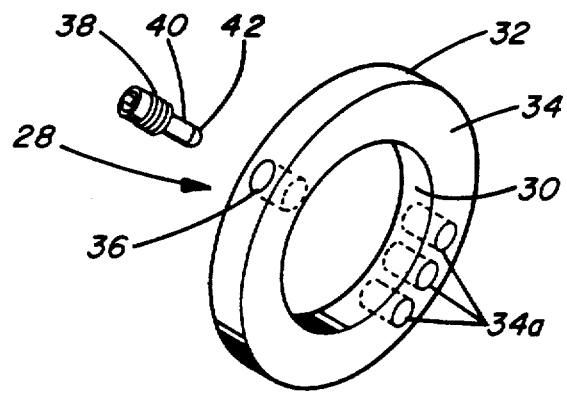
FIG. 3 is a perspective view of a balancing ring.
Figure 4:
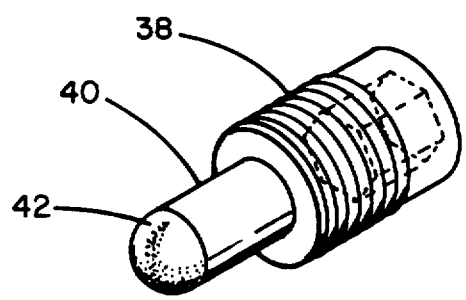
FIG. 4 is a perspective view of a set screw designed to secure a respective balancing ring to the tool holder.

The rotary tool assembly comprises a rotary tool holder 12 having an outer housing 12a and central axis 12b. Forming a part of the outer housing 12a is a collet chuck 12c that forms an opening within tool holder 12 for receiving a conventional collet 14. The collet 14 is in turn adapted to receive and hold a cutting tool, such as a drill 16. For purposes of clarity, the tool holder 12 is shown in FIG. 1 in schematic form and its nose piece or nose assembly that secures about the collet 14 and collet chuck 12c is not shown.

Tool holder 12 is provided with a ring balancing mechanism 28. Forming a part of the ring balancing mechanism is a cylindrical smooth bearing surface 18 that is formed completely around tool holder housing 12a. Defined about one side of cylindrical bearing surface 18 is a shoulder 20 that in the preferred embodiment shown herein forms a part of the tool holder housing 12a. Axially spaced towards the tool end of the tool holder 12 is a circumferential slit or groove 22 that extends around one side of the cylindrical bearing surface 18. A retaining ring 24 is positioned within slit 22 thereby defining an annular space between shoulder 20 and retaining ring 24.

Formed in the cylindrical bearing surface 18 is a pair of axially spaced set screw grooves 26.

Rotatively journalled on the cylindrical bearing surface between shoulder 20 and retaining ring 24 is a pair of balancing rings 28. Each balancing ring overlies a respective set screw groove 26 formed in the cylindrical bearing surface 18. Each ring 28 includes an inner bearing surface 30, an outer circumferential edge 32, and an annular body 34. Formed radially through the annular body 34 of each ring is a threaded set screw opening 36. Threaded into each threaded opening 36 is a set screw that includes a threaded portion 38, a ball type head 42 and an intermediate nonthreaded portion 40. The purpose of the intermediate nonthreaded portion 40 is to impart compressibility to the set screw. In particular, the nonthreaded portion 40 would be more susceptible to being compressed than the threaded portion 38. As will be more fully appreciated from considering the entire disclosure, the entire tool assembly will undergo centrifugal loading during operation. The balancing rings may expand or move outwardly under centrifugal loading so that the set screws lose contact with the bearing surface. To solve this problem, the set screws are torqued to compress the non-threaded portion 40 of the set screws. When the rings 28 expand, the set screws, due to being previously compressed, will elongate to maintain engagement with the set screw grooves 28.

Each balancing ring 28 is intentionally formed with a certain amount of imbalance. Preferably each balancing ring 28 has an equal amount of imbalance. The imbalance can be created by forming one or more openings 34a in the annular body 34 of the ring. In the case of the embodiment disclosed each balancing ring 28 is provided with three equally sized and equally spaced openings 34a. Each ring 28 is provided with an indexing mark on its outer edge which lies preferably on the same radial axis as the center of gravity of the balancing ring 28. In the preferred embodiment, the center of gravity of the balancing ring 28 lies on the radial axis of the set screw opening 36 which serves as the indexing mark. The indexing mark is used to position the balancing rings 28 as will be described in subsequent portions of the specification.

As seen in the drawings, the pair of balancing rings 28 are closely journalled about the cylindrical bearing surface 18 and are confined between the shoulder 20 and the retaining ring 24. To reduce noise generated by openings 34a during the operation of the tool holder 12, it is preferable that the respective openings 34a be hidden or otherwise enclosed. As seen in the drawings, shoulder 20 effectively closes openings 34a on the rear most ring 28. An optional face plate 35 is interposed between the foremost ring 28 and retaining ring 24 so as to effectively close the openings 34a of the foremost ring. It is appreciated that this could also be achieved by appropriately spacing retaining ring 24 and extending the same to cover openings 34a.

Each ring 28 can be rotated independently of the other ring and can be fixed with respect to the tool holder 12 by engaging the set screw ball head 42 into an underlying set screw groove 26. By providing the set screw groove 26 it is appreciated that the cylindrical bearing surface itself is not scarred or otherwise damaged by the engagement therewith of the set screws.

To balance tool holder 12 and an associated cutting tool 16, the balancing rings 28 are first placed in a balanced neutral position. In other words, the respective rings 28 are rotated and positioned such that the rings themselves produce a zero net balance effect. In the case of identically unbalanced rings 28, as disclosed herein, the rings are positioned such that indexing marks are located 180 degrees apart. This results in the unbalance associated with each ring cancelling the unbalance of the other ring.

Next, the particular cutting tool 16 to be used is inserted within the tool holder 12. By conventional means, the unbalance of the tool holder 12 and the inserted cutting tool 16 is determined. It should be pointed out that there are commercially available machines for determining the unbalance of such a tool assembly such as a MT-50 Tool Holder Balancer manufactured by American Hofmann. In determining the unbalance associated with the tool holder 12 and the cutting tool 16, there will be both a magnitude unbalance determined and also the angular position of that magnitude unbalance will be determined.

After determining both the magnitude and the angular position of the unbalance, the angular position of the balancing rings 28 must be calculated which will offset the tool imbalance. This can be done manually using a hand-held calculator, or the balancing machine can be programmed to provide the correct positions of the rings 28. In any event, the angular position of the balancing rings 28 is calculated using trigonometric formulas which are well known to those skilled in the art.

Once the correct position of the rings 28 is determined the set screws are loosened and the balancing rings 28 are rotated with respect to the tool holder 12 such that the net counterbalancing forces of the rings 28 is equal to and exactly opposite the tool imbalance. In other words, the rings 28 are positioned such that the magnitude of the net counter balancing force is equal to the magnitude of the tool imbalance, and the angular position of the net counterbalancing force is disposed 180 degrees from the angular position of the tool imbalance. At this time the rings can be securely fixed to the tool holder 12 by threading the set screws inwardly to where the ball head 42 engage and seats within respective underlying grooves 26. As pointed out above, the set screws can be tightened to compress nonthreaded portions 40. Thus when the balancing rings 28 expand due to centrifugal loading, the set screws will elongate to maintain contact with the grooves 26. Thus, the balancing rings 28 are firmly fixed to the tool holder 12 such that there is no relative movement between the two.

The following is an example of a balancing operation. A standard 50 V-flange collet chuck manufactured by Kennametal, Inc. of Latrobe, Pa. was equipped with two balancing rings weighing approximately 2 ounces a piece. The imbalance of each ring was approximately 14.5 gm.cm, so that a total maximum imbalance of 29 gm.cm was possible. The balancing rings were initially set 180 degrees apart so that the net balancing effect of the rings was zero. Using a Hofmann MT-50 Tool Holder Balancer, the collet chuck was found to have an imbalance of 7 gm.cm at 290 degrees with respect to a fixed reference on the balancer. The balancing rings were then set at 35 degrees and 185 degrees with respect to the same reference. The collet chuck was tested again and found to have an imbalance of 0.2 gm.cm at 110 degrees. The balancing rings were then moved to 34 degrees and 186 degrees respectively. Upon retesting, the collet chuck was found to have an imbalance of 0.1 gm.cm at 110 degrees. Each adjustment took approximately 3 minutes to make.

The ring balancing mechanism of the present invention could be incorporated into any rotary cutting tool holder or could be retrofitted into an existing rotary cutting tool holder or assembly. In this regard, many cutting tool manufacturers design rotary cutting tools such that the size of certain portions of the tool assembly conform to or fall within an industry standard tool envelope such as set by ANSI or ISO. Typically, the area of concern (i.e. the area to which the standard applies) is that area of the tool holder 12, as viewed in FIG. 1, extending upwardly from the lowermost balancing ring. This enables conforming tool assemblies to be interchangeable. Thus, it is important that the ring balancing mechanism of the present invention be of a design that can be incorporated within a rotary assembly and still enable the rotary assembly to still conform to a particular industry tool envelope standard. It is of particular significance that the present ring balancing design can be retrofitted into existing rotary tool assemblies in such a manner that the standard tool envelope is not exceeded and that the final retrofitted tool assembly still conforms to the industry tool envelope standard.

It should be pointed out that the present ring balancing tool mechanism could be incorporated into a series of coaxial assembled rotary tool holders. For example, the ring balancing mechanism described herein could be incorporated into a boring bar that is secured within a tool holder which itself is provided with a like ring balancing mechanism. Thus in such a tool assembly design, there would be balancing on different such assemblies at different axial locations.

From the foregoing specification and discussion it is appreciated that the ring balancing mechanism of the present invention enable a final balanced state to be achieved with a rotary cutting tool assembly quickly and efficiently. This is particularly important inasmuch as the above described balancing operation is typically formed for each new cutting tool inserted into a tool assembly. As indicated above, the tool balancing mechanism of the present invention tends to be precise, and easy to use and maintained.

The present invention may, of course, be carried out in other specific ways than those herein set forth without parting from the spirit and essential characteristics of the invention. The present embodiments are, therefore, to be considered in all respects illustrative and not restrictive, and all changes coming within the meaning and equivalency range of the appended claims are intended to be embraced therein.

We claim:

1. A rotary tool assembly comprising:
   (a) a rotary tool holder including an outer housing and means for receiving and retaining a cutting tool;
   (b) a cylindrical ring bearing surface formed about the outer housing of the rotary tool holder;
   (c) a pair of axially spaced grooves formed around the cylindrical ring bearing surface;
   (d) a pair of axially spaced unbalanced rings bearinged on the cylindrical ring bearing surface of the rotary tool holder such that each ring overlies a respective groove on the cylindrical bearing surface, each of the unbalanced rings being unbalanced about its longitudinal axis and rotatable around the cylindrical bearing surface, the pair of unbalanced rings being cooperative through selective adjustment to balance the entire rotary tool assembly;
   (e) a threaded radial bore formed through each ring; and
   (f) a set screw threaded within each radially threaded bore and including an engaging head that projects into and engages the underlying groove formed on the cylindrical bearing surface for securing the respective rings at a selected angular position about the rotary tool holder.

2. The rotary tool assembly of claim 1 wherein each set screw includes an intermediate nonthreaded portion that lies between the engaging head and a threaded portion of the set screw, and wherein the nonthreaded intermediate portion of the set screw is more susceptible to compression during securement and thereby may elongate under centrifugal loading but yet maintain sufficient engagement with the respective groove in order to securely hold the associated ring to the rotary tool holder.

3. The rotary tool assembly of claim 2 wherein the engaging head of each set screw is of has a hemispherical configuration.

4. The rotary tool assembly of claim 3 wherein the cylindrical ring bearing surface is machined and wherein there is provided a retaining shoulder along one edge of the cylindrical bearing surface and a side retainer about the other edge of the cylindrical bearing surface and wherein the retaining shoulder and side retainer form an open annular area about the cylindrical bearing surface for receiving the balancing rings.

5. In a rotary tool assembly having a rotary tool holder having an outer housing and means for receiving and securing a cutting tool within the rotary tool holder, the improvement comprising a readily adjustable external ring balancing mechanism for balancing the rotary tool assembly and cutting tool secured therein, comprising:
   a) an outer cylindrical ring bearing surface formed around the outer housing of the rotary tool holder such that the ring bearing surface is exposed about the outer housing;
   b) a pair of cooperating balancing rings journalled around the outer cylindrical ring bearing surface and operative to assume both an unsecured mode and a secured mode;
   c) each balancing ring being unbalanced about its longitudinal axis and rotatively confined on the outer cylindrical bearing surface such that in the unsecured mode each balancing ring may be freely rotated completely independent of the other such that the rings may be selectively positioned to balance the rotary tool assembly;
   d) in the unsecured mode each balancing ring being freely rotatable by hand around the outer ring bearing surface such that in the unsecured mode the balancing rings may be freely rotated and positioned by hand to balance the rotary tool assembly; and
   e) retaining means for securing the respective balancing rings in the secured mode to the outer cylindrical bearing surface at the selected position, said retaining means including a radially threaded bore formed in each ring and a threaded set screw secured within the radial bore and operative when screwed into engagement with the underlying rotary tool holder for fixedly securing the respective balancing rings to the tool holder.

6. The rotary tool assembly of claim 5 wherein there is provided axially spaced side retainers disposed adjacent the outer cylindrical bearing surface for retaining the balancing rings on the tool holder.

7. The outer rotary tool assembly of claim 5 wherein the outer cylindrical bearing surface is machined into the outer housing of the rotary tool holder.

8. The outer rotary tool assembly of claim 5 wherein the outer cylindrical bearing surface is machined to form a shoulder that lies adjacent one side of a respective ring so as to generally confine the outer adjacent ring on the outer cylindrical bearing surface.

9. The rotary tool assembly of claim 8 wherein there is provided a side retainer axially spaced from the shoulder and wherein the shoulder and the side retainer define a space therebetween for receiving the pair of balancing rings.

10. The rotary tool assembly of claim 5 wherein there is provided a pair of axially spaced circumferential set screw grooves formed around the outer cylindrical bearing surface and wherein in the secured mode the respective set screws extend into the cylindrical bearing surface and engage the set screw grooves so as to secure the balancing rings to the rotary tool holder.

11. The rotary tool assembly of claim 10 wherein each set screw includes a ball type head, a threaded portion spaced from the ball type head, and an intermediate nonthreaded portion lying between the ball type head and the threaded portion and wherein the nonthreaded intermediate portion is more susceptible to compression than the threaded portion, whereby in securing a respective ring about the tool holder the set screw can actually experience compression which permits the set screw to slightly elongate in response to experiencing centrifugal loading and yet the elongating set screw will maintain sufficient engagement with the outer housing of the rotary tool holder to maintain a fixed relationship between the tool holder and the respective balancing rings.

12. The rotary tool assembly of claim 5 wherein the respective rings are substantially structurally identical such that the respective degrees of unbalance are equal.

13. The rotary tool assembly of claim 5 wherein the respective rings are essentially equally unbalanced.

14. A method of balancing a tool holder assembly having an outer housing comprising the steps of:
   (a) forming a circumferential ring bearing surface completely around the housing of the tool holder assembly;
   (b) rotatively mounting two completely independent closed balancing rings about the circumferential bearing surface such that the respective balancing rings may be rotated about the bearing surface independently of each other;
   (c) balancing the two rings about the tool holder assembly and securing the rings to the tool holder assembly in their respective balanced positions;
   (d) determining the magnitude and angular position of the unbalance of the tool holder assembly;
   (e) rotating the balancing rings independently of and relatively to each other to form a ring unbalance about the longitudinal axis of each ring whose magnitude generally equals the magnitude of the determined unbalance of the tool holder assembly, and then rotating the rings together to where the unbalance associated with the rings lie diametrically opposite the determined angular position of the unbalance of the tool holder assembly; and
   (f) securing both rings to the tool holder assembly such that the unbalance associated with the rings counters the unbalance of the tool holder assembly.

15. The method of claim 14 including the step of forming a pair of axially spaced set screw grooves around the circumferential bearing surface such that each groove underlies a respective balancing ring; and securing each ring to the tool holder assembly by radially extending a set screw inwardly through the ring and engaging the groove with the set screw so as to fix the ring to the tool holder such that the ring will rotate with the tool holder.

16. The method of claim 14 wherein the step of balancing the rings on the tool holder assembly includes rotating and securing the respective rings on the tool holder in a balanced neutral position so that the rings together have a zero net balance.

17. The method of claim 16 wherein the step of balancing the rings include forming at least two equally unbalanced rings and rotating and securing the rings about the tool holder assembly such that the center of gravity of each ring lies approximately 180 degrees apart.

18. A method of balancing a rotary tool holder adapted to receive and hold a cutting tool comprising the steps of:
   (a) forming a cylindrical ring bearing surface around the tool holder,
   (b) forming a pair of unbalanced rings and referencing like points of unbalance on the rings, each ring being unbalanced about its longitudinal axis;
   (c) journalling the two closed balancing ring completely around the cylindrical bearing surface of the tool holder such that each ring can be rotated independently of the other;
   (d) axially confining the balancing rings on the cylindrical bearing surface;
   (e) balancing the two rings about the tool holder by positioning the rings such that like unbalance reference points lie 180 degrees apart and securing the rings to the tool holder thereat;
   (f) inserting a cutting tool into the tool holder;
   (g) determining the magnitude and angular position of the unbalance of a tool holder and cutting tool; and
   (h) rotating the balancing rings relative to each other to form a ring unbalance whose magnitude generally equals the determined magnitude of the unbalance of the tool holder and cutting tool and positioning the balancing rings such that the unbalance associated therewith lies directly opposite the position of the determined unbalance of the tool holder and cutting tool.

19. The method of claim 18 including the step of forming a pair of axially spaced set screw grooves about the cylindrical bearings surface and extending set screws radially inwardly through the respective rings to where the set screws seat and engage the grooves so as to anchor the respective rings to the tool holder.

20. The method of claim 19 including providing respective set screws with an intermediate nonthreaded portion that is susceptible to compression during securement of the respective rings to the tool holder such that the set screws may slightly elongate under centrifugal loading without disengagement from the underlying groove.

21. The method of claim 18 including the step of unbalancing each ring such that the unbalance associated with one ring is equal with the unbalance associated with the other ring.

22. A method of retrofitting a rotary tool holder with a ring balancing mechanism without the retrofit exceeding standard tool envelope criteria, comprising the steps of:
   (a) forming an outer cylindrical ring bearing surface about a housing structure forming a part of the rotary tool holder;
   (b) journalling a pair of unbalanced balancing rings, each ring being unbalanced about its longitudinal axis, on the outer cylindrical ring bearing surface such that the rings in an unsecured mode may be freely rotated completely independently of the other about the ring bearing surface;
   (c) manually rotating the balancing rings with respect to each other to a tool holder balanced position where the rotary tool holder is balanced;
   (d) axially confining the rings to the retrofitted outer cylindrical bearing surface of the tool holder;
   (e) securing the respective balancing rings in a secured mode to the outer cylindrical bearing surface of the retrofitted tool holder at the selected balance position by radially boring and threading the rings to form radial set screw openings and threading set screws therein that can be moved selectively into contact with the tool holder; and
   (f) confining the retrofitted ring balancing mechanism to an area about the rotary tool holder such that the tool holder as retrofitted with the balancing rings falls within the standard tool envelope criteria.

23. The method of claim 22 including the step of machining the outer cylindrical bearing surface into the housing of the outer tool holder to be retrofitted.

24. The method of claim 22 including the step of forming a pair of axially spaced set screw grooves in the cylindrical bearing surface such that each groove underlies a respective ring whereby in securing the rings to the tool holder the respective set screws are turned to where they project into and engage the underlying set screw grooves thereby avoiding the possibility of scarring and otherwise damaging the cylindrical bearing surface.

25. The method of claim 22 wherein each ring is formed with an equal unbalance.

26. The method of claim 23 wherein in the process of machine forming the cylindrical bearing surface the process include forming at least one side retaining shoulder within the housing of the tool holder which act to axially confine an adjacent ring.

27. The rotary tool assembly of claim 5 wherein each balancing ring is formed with one or more openings located on the balancing ring so as to provide an eccentric mass to the balancing ring.

* * * * *